(12) United States Patent
Terry

(10) Patent No.: US 11,582,404 B2
(45) Date of Patent: Feb. 14, 2023

(54) METHODS AND SYSTEMS FOR CONTROLLING A LIGHT SOURCE OF A CUE LIGHT DEVICE

(71) Applicant: Capital One Services, LLC, McLean, VA (US)

(72) Inventor: Timothy Terry, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 119 days.

(21) Appl. No.: 17/237,894

(22) Filed: Apr. 22, 2021

(65) Prior Publication Data

US 2021/0368111 A1  Nov. 25, 2021

Related U.S. Application Data

(63) Continuation of application No. 16/881,045, filed on May 22, 2020, now Pat. No. 11,012,638.

(51) Int. Cl.
  *G08B 1/08* (2006.01)
  *H04N 5/268* (2006.01)
  *G08B 5/36* (2006.01)

(52) U.S. Cl.
  CPC ............. *H04N 5/268* (2013.01); *G08B 5/36* (2013.01)

(58) Field of Classification Search
  CPC . H04N 5/268; H04N 5/76; G08B 5/36; H01H 9/284; F21V 23/04
  See application file for complete search history.

(56) References Cited

U.S. PATENT DOCUMENTS

| | | | |
|---|---|---|---|
| 6,190,025 | B1 | 2/2001 | Solinsky |
| 9,324,244 | B1 | 4/2016 | Sol |
| 9,622,330 | B2 | 4/2017 | Lashina et al. |
| 2006/0247068 | A1 | 11/2006 | Lagaipa |
| 2019/0166670 | A1 | 5/2019 | Alfier et al. |

*Primary Examiner* — Toan N Pham
(74) *Attorney, Agent, or Firm* — Bookoff McAndrews, PLLC

(57) ABSTRACT

A cue light device may comprise one or more connection interfaces configured for electrical coupling to a video switcher via a cable; a microcontroller configured to obtain and analyze data from the video switcher via the cable and the one or more connection interfaces; a multi-position switch configured to selectively permit a segment of the data to be processed by the microcontroller; and a light source electrically coupled to the microcontroller and configured to selectively illuminate based on a configuration of the multi-position switch.

20 Claims, 7 Drawing Sheets

METHODS AND SYSTEMS FOR CONTROLLING A LIGHT SOURCE OF A CUE LIGHT DEVICE

CROSS-REFERENCE TO RELATED APPLICATION(S)

This patent application is a continuation of and claims the benefit of priority to U.S. Nonprovisional patent application Ser. No. 16/881,045, filed on May 22, 2020, now U.S. Pat. No. 11,012,638, the entirety of which is incorporated herein by reference.

TECHNICAL FIELD

Various embodiments of the present disclosure relate generally to a cue light device, and, more particularly, to controlling a light source of a cue light device, and to systems that include cue light devices.

BACKGROUND

During live events, when multiple devices having potential source displays (e.g., for broadcasting, presenting, or streaming) are present, it may be difficult to know which device is currently "live," or being presented to an audience. Additionally, operators of the devices may need to make last minute changes or adjustments to presentation materials during the live events, and it is imperative that the operators make these changes or adjustments on devices when the devices are not in operation so the ongoing events are not interrupted.

The present disclosure is directed to addressing one or more of the above-referenced challenges. Unless otherwise indicated herein, the materials described in this section are not prior art to the claims in this application and are not admitted to be prior art, or suggestions of the prior art, by inclusion in this section. This section is for the purpose of generally presenting the context of the disclosure.

SUMMARY OF THE DISCLOSURE

According to certain aspects of the disclosure, methods and systems are disclosed for controlling a light source of a cue light device.

In an aspect, a cue light device may comprise one or more connection interfaces configured for electrical coupling to a video switcher via a cable; a microcontroller configured to obtain and analyze data from the video switcher via the cable and the one or more connection interfaces; a multi-position switch configured to selectively permit a segment of the data to be processed by the microcontroller; and a light source electrically coupled to the microcontroller and configured to selectively illuminate based on a configuration of the multi-position switch.

In another aspect, a method for controlling a light source of a cue light device may comprise obtaining video switch data from a remote video switcher; determining position data from a multi-position switch of the cue light device; determining an instructed status of the cue light device based on the video switch data and the position data using one or more algorithms; and controlling, via a microcontroller of the cue light device, the light source of the cue light device based on the instructed status of the cue light device.

In yet another aspect, a method for controlling a light source of a cue light device may comprise obtaining video switch data from a remote video switcher, wherein the video switch data comprises a status of one or more video switches of the video switcher; determining position data of a switch of the cue light device, wherein the position data is indicative of a segment of the video switch data to be processed by a microcontroller of the cue light device; comparing, via the microcontroller, the video switch data and the position data; determining an instructed status of the cue light device based on the comparison between the video switch data and the position data; and controlling, via the microcontroller, based on the instructed status of the cue light device, wherein the controlling comprises controlling at least one of an on-off operation, a brightness, or a mode of the light source.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments, and together with the description, serve to explain the principles of the disclosed embodiments.

Figure 1:
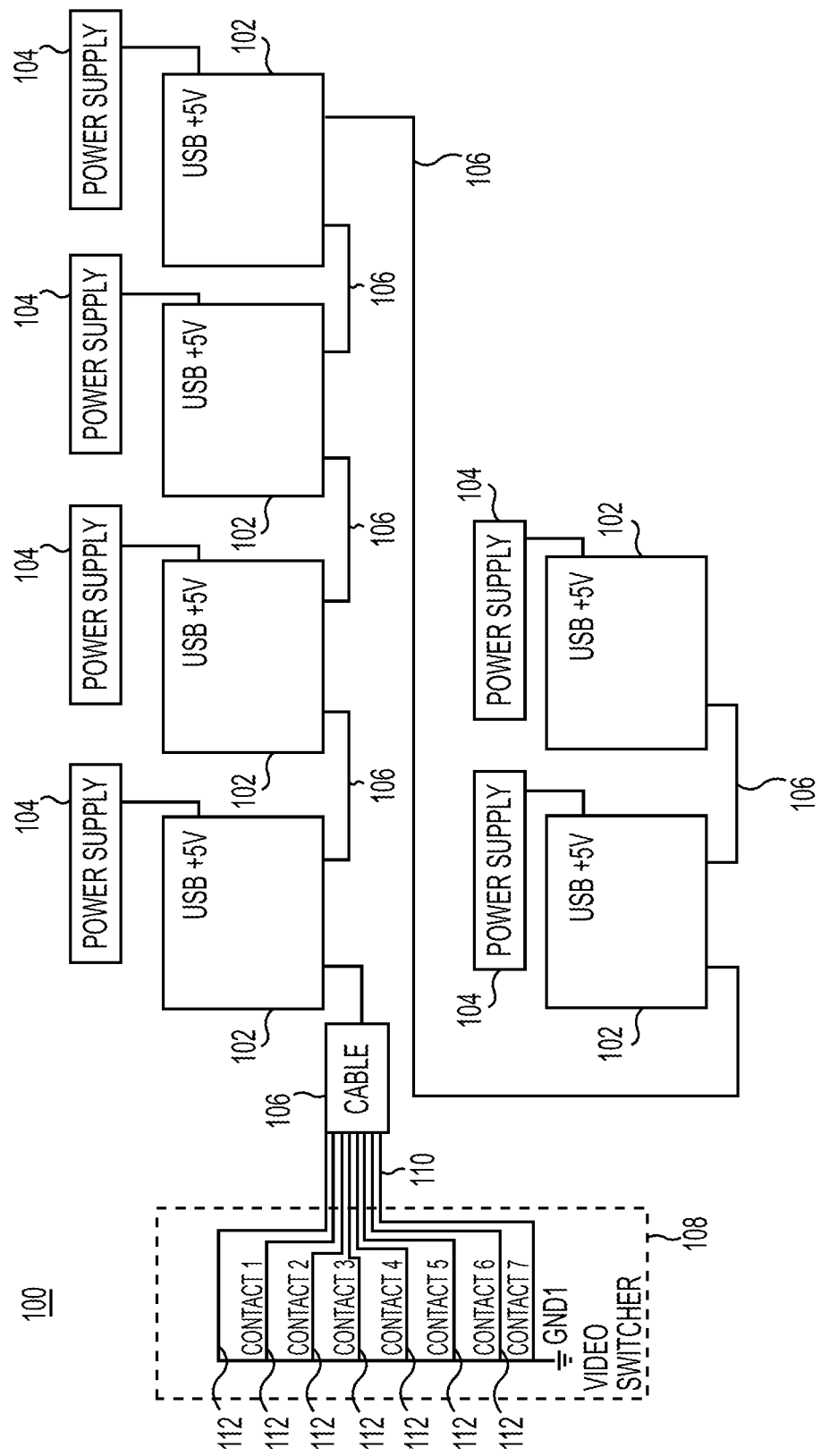
FIG. 1 depicts an exemplary system for controlling a light source of a cue light device, according to one or more embodiments.

There are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION OF EMBODIMENTS

Some embodiments of the present disclosure may enable presenters and/or other operators to quickly and confidently know which device(s) out of multiple devices used for a presentation are live (e.g., broadcasting to a presentation display or other output), and which are not. Advantageously, after determining which device(s) are live, an operator may make changes or make preparations for broadcast on devices that are not live.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, a cue light device may be attached permanently or temporarily to an electronic device to provide a visual indication (e.g., color changes, on-off changes, brightness changes) of an on-off (e.g., live/not live, or on-air/not on-air) status of the electronic device. The cue light device may be connected via a wired or wireless connection to a remote video switcher. A microcontroller and/or algorithms may be used to generate such visual indication. In some embodiments, the cue light device may be used in audio/visual broadcast control rooms, in backstage tech/graphics areas, or in any other location where an electronic device or devices may be positioned for broadcasting media to an audience during a live event with either an in-person or a remote audience.

FIG. 1 shows an exemplary system for controlling a light source of a cue light device, according to one or more embodiments. As shown in the FIG. 1, the system 100 may comprise a plurality of cue light devices 102, a plurality of power supplies 104, a plurality of cables 106, and a remote video switcher 108. Each of the plurality of cue light devices 102 may be connected with a given power supply 104 associated with a given electronic device (e.g., a laptop computer, desktop computer, tablet, or other electronic device). The remote video switcher may include one or more video switches (or outputs). The one or more video switches may receive one or more inputs, which may change the status of the one or more video switches (e.g., the on or off status of the video switches; or the contact closure status of the video switches). For example, upon receipt of a respective input at a switch of the remote video switcher 108, an associated contact closure may be engaged to thereby change the status of the switch to produce an output (e.g., the output may in turn become an input for a cue light device 102). In some embodiments, the remote video switcher may include at least 1, 2, 3, 4, 5, 6, 7, 8 or more video switches. In some embodiments, the remote video switcher may include at most 8, 7, 6, 5, 4, 3, 2 or less video switches. In one example, the remote video switcher may include 7 video switches, and each of the video switches may be associated with a wire of a Cat5 cable. In this situation, one wire that is not associated with a video switch may be connected to the ground. Further details of the electronic devices, cue light devices 102, and remote video switcher 108 are described elsewhere herein. One cue light device 102 may be connected with another cue light device 102 in parallel or in series (e.g., in series as shown in FIG. 1).

One cue light device 102 may be connected with another cue light device 102 via a given cable of the plurality of cables 106. In some embodiments, the plurality of cables may include a Cat5 cable, connecting the video switcher 108 to one or more of the cue light devices 102. A cable of the plurality of cables 106 may be adaptable to different types of connectors and/or connections suitable for transmitting and/or receiving signals. The plurality of cables 106 may be configured to carry any types of signals, such as telephony and video signals, binary signals, or any other type of electronic signals. A given Cat5 cable 106 may include a plurality of wires at a connection 110 between the remote video switcher 108 and a cue light device 102. For example, a given Cat5 cable 106 may include 8 wires, which may be connected with the remote video switcher 108. The remote video switcher 108 may include a built-in connection (e.g., tally connection), which may work like a relay and close a video switch or contact when an electronic device goes live. The remote video switcher 108 may include one or more video switches 112. Each of the 8 wires 110 may be connected to each of the one or more video switches 112. In some embodiments, 7 wires of the 8 wires may be connected to 7 video switches, respectively, and the remaining one wire of the 8 wires may be connected to the ground.

The one or more power supplies 104 may be connected to the one or more cue light devices 102 to provide power to the cue light devices 102. The one or more power supplies 104 may comprise a direct current (DC) or an alternating current (AC) power source. A given power supply may be part of an electronic device. In some embodiments, no external power supply may be connected to a cue light device 102. In such embodiments, the cue light device 102 may include a power source (e.g., a battery), which provides electric power to any components (e.g., light source, microcontroller) in the cue light device 102.

Although one cue light device 102 may be connected with another cue light device 102 via a given cable 106 (e.g., a wired connection) as shown in FIG. 1, in some embodiments, one cue light device 102 may be connected with another cue light device 102 via a wireless connection, e.g., as a part of a wireless network. Such wireless network may be any suitable wireless network or combination of wireless networks and may support any appropriate protocol suitable for communication of data or signal from one cue light device 102 to another cue light device 102 and/or to the video switcher 108. A wireless implementation may include a cue light controller device that attaches to the remote video switcher or video switches. Such wireless network may be implemented as the Internet, Bluetooth, Near Field Communication (NFC), or any other type of wireless network that may provide communications between one cue light device 102 and another cue light device 102, and/or communications between one or more cue light devices 102 and the remote video switcher 108.

Figure 2:
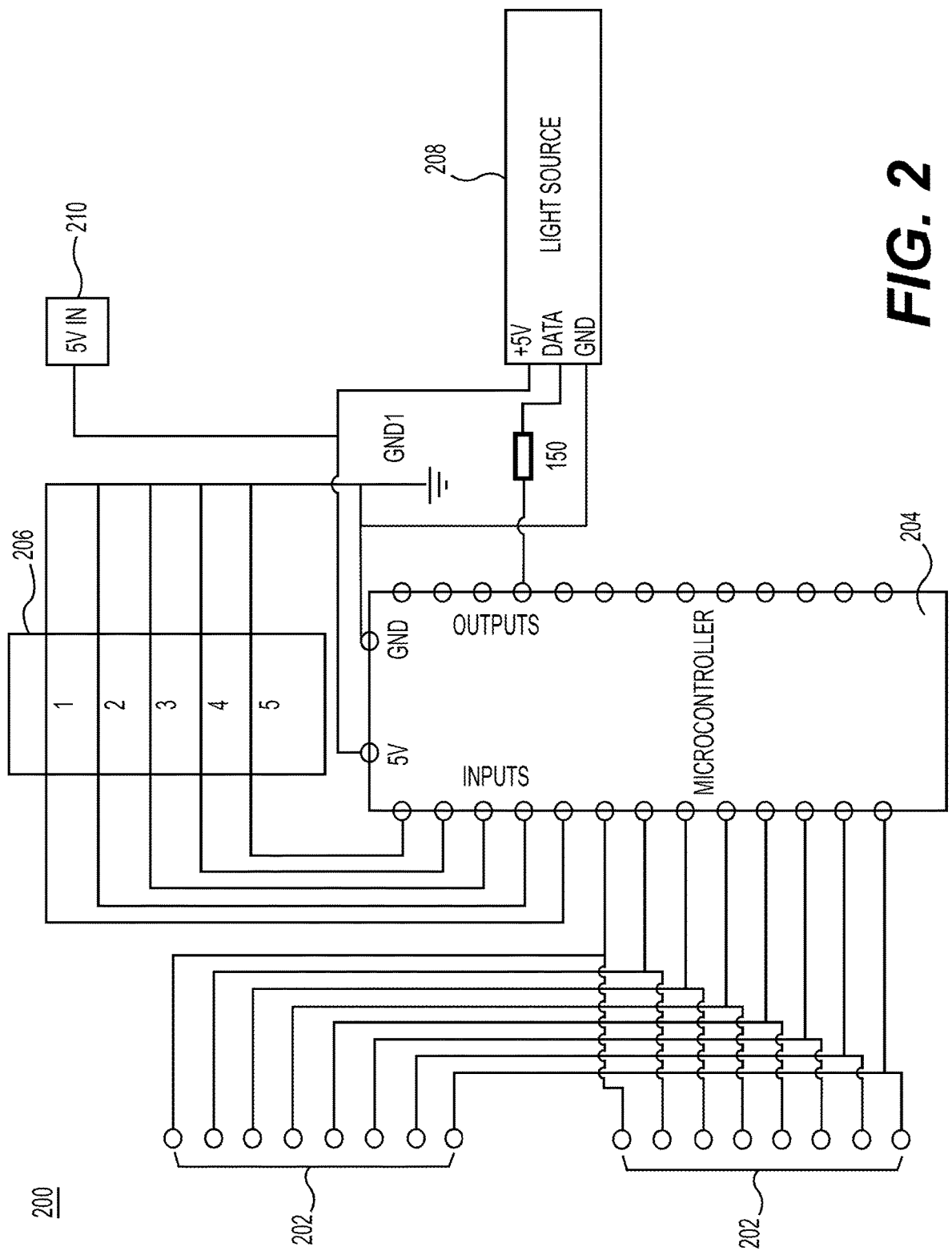
FIG. 2 depicts an exemplary cue light device, according to one or more embodiments.

FIG. 2 shows, in schematic form, an exemplary cue light device 200, according to one or more embodiments. In some embodiments, each cue light device 102 depicted in FIG. 1 may include any and all features of the cue light device 200 described herein. In an aspect, a cue light device 200 may comprise one or more connection interfaces 202; a microcontroller 204; a multi-position switch 206; a light source 208, and a power source 210. The multi-position switch 206 may be a switch array that allows the multi-position switch 206 to function as a plurality of independent switches.

The one or more connection interfaces 202 may be configured for electrical coupling of the microcontroller 204 to a remote video switcher (e.g., the remote video switcher 108 via a cable 106, as described in FIG. 1). The one or more connection interfaces 202 may include one or more input-output interfaces or modular connection interfaces, which may allow exchange of signals or data between an external device such as a remote video switcher (e.g., the remote video switcher 108), the microcontroller 204, the multi-position switch 206, and the light source 208. The one or more connection interfaces 202 may include one or more communication interfaces, which may include one or more components used for signals or data exchange (e.g., plug and socket, connectors, wires, etc.). Mechanical, electrical and logical signals or data may pass across the one or more components. One or more interface protocols (e.g., programmed into the microcontroller 204) may be used for sequencing the signals or data. The signals or data may be video switch signals or video switch data. The one or more communication interfaces may include an 8 position 8 contact (8P8C) interface, such as a RJ 45 interface.

The microcontroller 204 may be configured to obtain and analyze data, such as video switch data and/or signal data from the remote video switcher 108 via the one or more cables 106 and the one or more connection interfaces 202. Generally, the microcontroller 204 may be configured to interpret instructions as to whether the cue light device 200 should emit a light (and, in some embodiments, what type of light), control the light source 208, and transmit a status of the light source 208 (e.g., on, off, emitting a particular color or pattern of lights, etc.). In some embodiments, the microcontroller 204 may be configured to determine position data of a multi-position switch 206 of the cue light device 200, compare data received from a remote video switcher with the position data of the multi-position switch 206, determine an instructed status of the cue light device 200 based on the compared data using one or more algorithms, and/or control the light source 208 of the cue light device 200 based on the instructed status of the cue light device 200. Details of the position data, the data received from a remote video switcher, and the instructed status of the cue light device 200 are described elsewhere herein. The microcontroller 204 may comprise a processor and memory on a single chip. The processor may be any suitable processor, such as a 4-bit, 8-bit, 16-bit, 32-bit or 64-bit processor. The memory may comprise random access memory (RAM), flash memory, erasable programmable read-only memory (EPROM) or electrically erasable programmable read-only memory (EEPROM). In some embodiments, the microcontroller 204 may be an Arduino Pro Micro controller (Arduino).

The light source 208 may be electrically coupled to the microcontroller 204, such that the microcontroller 204 may selectively illuminate the light source 208 based on a configuration of the multi-position switch 206. The light source 208 may include any type of source that can emit light, including, for example, an incandescent lamp, an electric discharge lamp (e.g. fluorescent lamp), or and/or an electroluminescent source (e.g., one or more light-emitting diodes).

The multi-position switch 206 may be configured to selectively permit a segment of the data to be processed by the microcontroller. The multi-position switch 206 may include at least 2, 3, 4, 5, 6, 7, 8, or more positions. In some embodiments, the multi-position switch 206 may include at most 8, 7, 6, 5, 4, 3, or 2 positions. In one example, the multi-position switch 206 may include 5 positions. Each position may include an individual switch, such as a binary switch. Each position may, e.g., control one or more characteristics of the light source 208, either alone or in combination with other positions of the multi position switch 206. For example, one of the 5 positions of the multi-position switch 206 may be a "brightness position" and may control a brightness of the light source 208. In this situation, an "on" operation of the brightness position may make the light source bright, and an "off" operation of the brightness position may make the light source dim. As another example, one of the positions of the multi-position switch 206 may control a color of the light source 208. The color of the light source may include any color, such as green, red, yellow, purple, blue, white, or pink. As yet another example, one of the positions of the multi-position switch 206 may control a mode of the light source 208. The mode of the light source 208 may include an operation pattern of the light source. For example, the operation pattern of the light source 208 may include a blinking pattern, such that the light source 208 is on for, e.g., 1 second, and off for 1 second (or any suitable interval), repeatedly. In another example, the operation pattern of the light source 208 may include an alternating color flashing pattern, such that the light source 208 shows a green light for 1 second and then shows a red light for 1 second (or any suitable interval), repeatedly. In yet another example, the operation pattern of the light source 208 may include the light source 208 showing a solid light for a pre-determined period of time. The pre-determined period of time may be at least 1 minute, 1 hour, or longer, or any suitable period of time. In some embodiments, the pre-determined period of time may be at most 1 hour, 1 minute, or shorter.

The multi-position switch 206 may be further configured to provide an indication to, e.g., the microcontroller 204 as to what information from an external source, such as the remote video switcher 108, is relevant to the cue light device 200. In some embodiments, the multi-position switch 206 may indicate a signal or information source relevant to the cue light device 200 based on an on-off status of multiple positions, such as 3 positions, 4 positions, or more positions. In such embodiments, specific combinations of the multiple positions (e.g., the 3 positions) may be associated with one video switch of a remote video switcher (e.g., one of the video switches 112 of the remote video switcher 108) based on an exchange between a binary code and a decimal code. An "on" status of a position may correspond to binary code "1," and an "off" status of a position may correspond to binary code "0." For example, if the on-off status of the 3 positions is "on-on-off," then the binary code may be 110, which is corresponding to a decimal code "6," representing the sixth video switch of the remote video switcher 108. In this case, a segment of data or signal from sixth video switch instead of the rest of the video switches may be deemed as instructional to the microcontroller 204 of the cue light device 200. In another example, if the on-off status of the 3 positions is off-on-on, then the binary code may be 011, which is corresponding to a decimal code "3," representing the third video switch of the remote video switcher 108. In this case, a segment of data or signal from the third video switch instead of the rest of the video switches may be deemed as instructional to the microcontroller 204 of the cue light device 200. The multi-position switch 206 may be programmed, e.g., manually, by activating and/or deactivating manual switches on the multi-position switch 206, and/or may be programmed digitally, e.g., by way of a switch-programming algorithm executed by, e.g., the microcontroller 204 or another device connected to the multi-position switch 206.

Figure 3A:
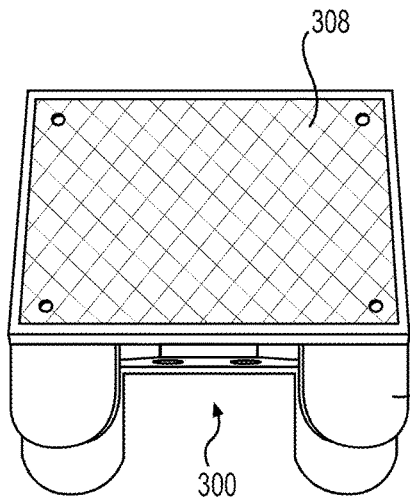
FIGS. 3A-3H depict one or more components of a housing of a cue light device, according to one or more embodiments.
Figure 3B:
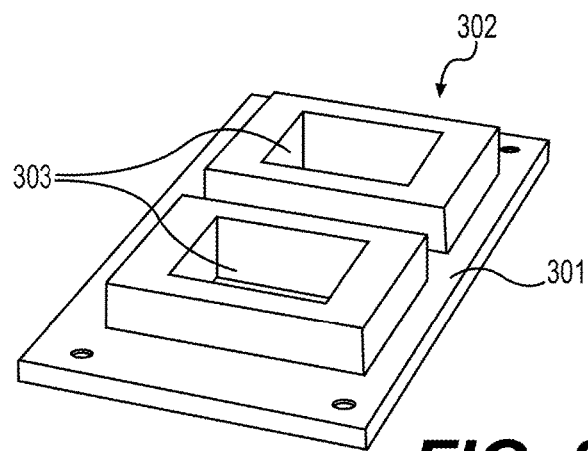
Figure 3C:
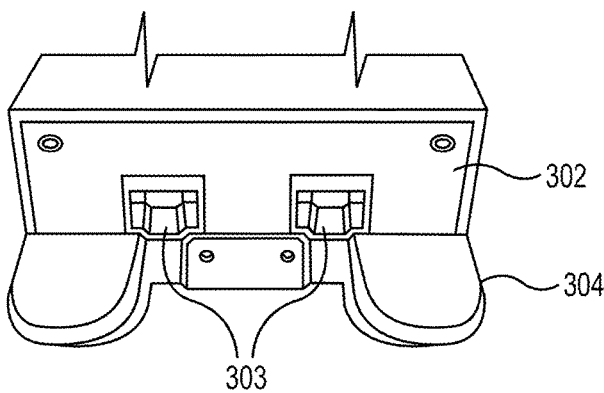
Figure 3D:
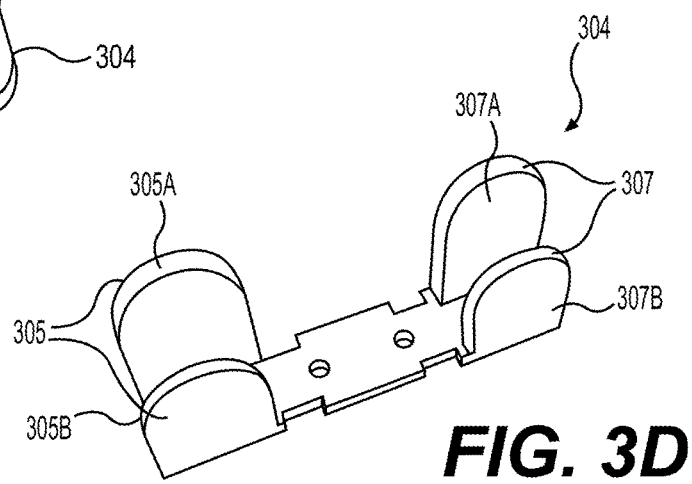
Figure 3E:
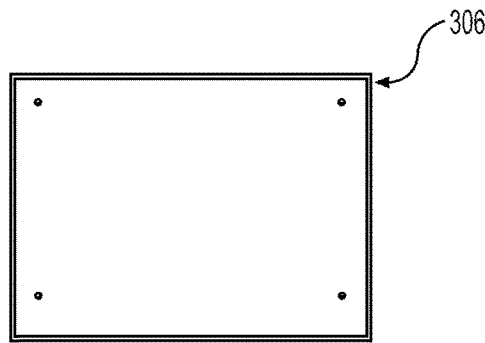
Figure 3F:
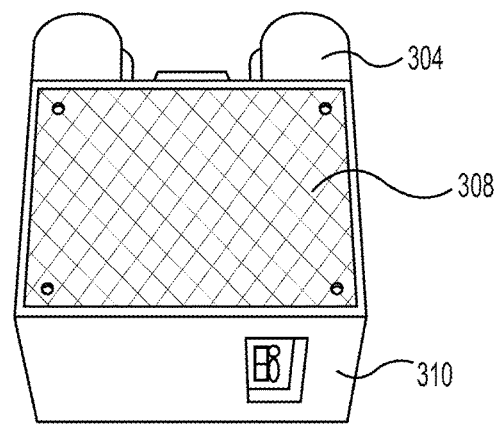
Figure 3G:
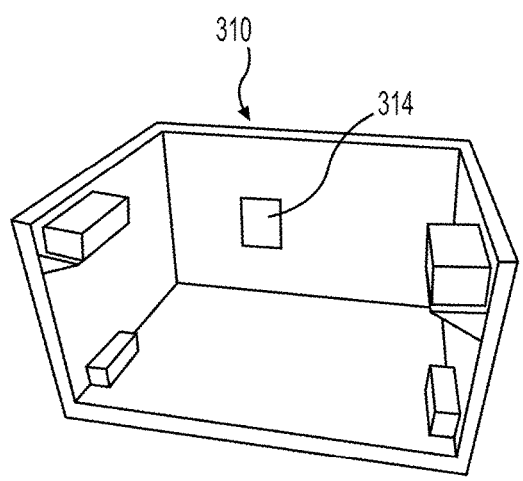
Figure 3H:
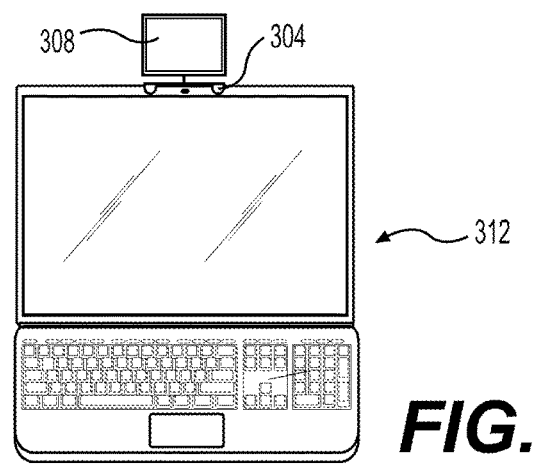

FIGS. 3A-3H depict components of a cue light device (e.g. a cue light device 102 and/or a cue light device 200), according to one or more embodiments. A housing 300, depicted in FIG. 3A, may be configured to at least partially enclose one or more connection interfaces (e.g., connection interfaces 202), a microcontroller (e.g., the microcontroller 204), a multi-position switch (e.g., the multi-position switch 206), and a light source (e.g., the light source 208). The housing 300 may include a sides structure 310 (depicted in FIG. 3G). Additionally, the cue light device may include a bottom structure 302 (FIG. 3B), an attachment structure 304 (FIGS. 3C, 3D, 3F, and 3H), a front structure (e.g., a front panel) 306 (FIG. 3E), and a filter and/or screen 308 (FIGS. 3A, 3F, and 3H).

The bottom structure 302 may include a bottom panel 301 with one or more openings 303 passing through the bottom panel 301. The bottom structure 302 may be configured to attach one or more cables (e.g., cables 106, depicted in FIG. 1) through the one or more holes 303. The one or more holes 303 may be used to mount a standard cable adapter/plug (e.g., a modular RJ45 female jack). The one or more holes 303 may be modified to support any other cable/connector type. The particular geometries of the bottom structure 302 may be any suitable geometries. In some embodiments, the particular size, shape, and/or structure of the bottom structure 302 may be configured to secure and/or dovetail the bottom structure 302 with other components of the housing 300 or the cue light device.

The attachment structure 304 may include a first pair of arms 305 and a second pair of arms 307. A first arm 305A of the first pair of arms and a first arm 307A of the second pair of arms may be configured to contact a first surface of an electronic device, as shown in assembly 312 depicted in FIG. 3H. A second arm 307B of the first pair of arms and a second arm 305B of the second pair of arms may be configured to contact a second surface of the electronic device opposite the first surface. Together, the first pair of arms 305 and the second pair of arms 307 may assist in ensuring that the housing 300 is adequately attached to, positioned on, or affixed to the electronic device.

The front structure 306 may include a front panel. The front structure 306 may be made with transparent or translucent material (e.g., plastic, Plexiglas, or glass) so that light from an internal light source can pass through the front structure 306. The front structure 306 may be configured to be coupled with the filter and/or screen 308 exterior to the front structure 306, and/or with a light source (e.g., a light source 208 inside the housing 300). The front structure 306 also may be configured to be coupled with the bottom structure 302 and the sides structure 310 of the housing 300. The filter and/or screen 308 may cover the front structure 306, to provide an additional protection for a light source interior to the housing 300 and/or to provide additional light filtration.

The sides structure 310 may include a top and one or more side walls, and may include one or more openings 314 (depicted in FIG. 3G) for, e.g., access to a multi-position switch (e.g., the multi-position switch 206) and/or one or more power connections for one or more power supplies. Generally, the sides structure 310 may have any suitable size and/or shape to accommodate all parts of a cue light device and/or to be attached to, affixed to, or positioned on an electronic device. The housing 300 may be formed of any material, such as metallic material, metal-containing material, semiconductor-containing material, polymeric material, or composite material. While the housing 300 is depicted as having a generally box-like shape, it is contemplated that the housing 300 and the cue light device as a whole may have any suitable shape (e.g., spherical, flat, oblong, etc.). Moreover, the front structure 306 and/or the filter and/or screen 308 may be positioned at any suitable location to allow an internal light source to emit light out of the housing 300 (e.g., through the top, back, or any or all sides of the housing 300).

An electronic device may be a laptop. In some other examples, the electronic device may be a mobile device (e.g., smartphone, tablet, pager, personal digital assistant (PDA)), a computer (e.g., laptop computer, desktop computer, server), or a wearable device (e.g., smartwatches). The electric device can also include any other media content player, for example, a set-top box, a television set, a video game system, or any electronic device capable of providing or rendering data. The electronic device may optionally be portable. The electronic device may be handheld. The electronic device may be capable of connecting to a wired or wireless network, such as a local area network (LAN), wide area network (WAN) such as the Internet, a telecommunications network, a data network, or any other type of network.

Figure 4:
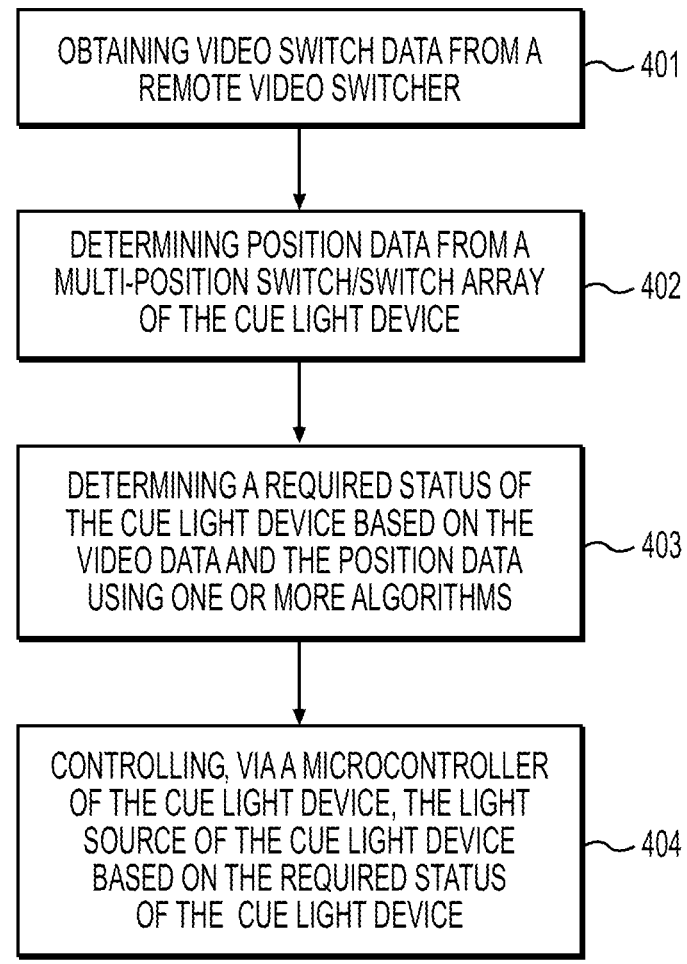
FIG. 4 depicts an exemplary flowchart illustrating a method for controlling a light source of a cue light device, according to one or more embodiments.

FIG. 4 is a flowchart illustrating a method for controlling a light source of a cue light device, according to one or more embodiments of the present disclosure. The method may be performed by computer system described in FIG. 6.

Step 401 may include a step of obtaining video switch data from a remote video switcher (e.g., the remote video switcher 108). The remote video switcher may include one or more video switches. In some embodiments, the remote video switcher may include at least 1, 2, 3, 4, 5, 6, 7, 8 or more video switches. In some embodiments, the remote video switcher may include at most 8, 7, 6, 5, 4, 3, 2 or less video switches. In one example, the remote video switcher may include 7 video switches, and each of the video switches may be associated with a wire of a Cat5 cable. In this situation, one wire that is not associated with a video switch may be connected to the ground.

The video switch data may include a status of one or more video switches (e.g., sources, inputs, video switcher status data, etc.) of the remote video switcher. The status of the one or more video switches of the remote video switcher may include an on-off status of the one or more video switches. The on-off status of the one or more video switches may represent, either alone or in combination, which video switch of the one or more video switches is on. For example, the on-off status of the one or more video switches may include a status that the first video switch is on and the rest of the video switches are off. In another example, the on-off status of the one or more video switches may include a status that the second video switch is on and the rest of the video switches are off.

The remote video switcher 108 may include one or more processors to program the status of the one or more video switches. In this situation, one or more algorithms may be used to program the status of the one or more video switches. The status of the one or more video switches may be constant during a predetermined period. For instance, during a period of two hours, the status of the one or more video switches may be that the second video switch is on and the rest of the video switches are off. In some embodiments, the status of the one or more video switches may vary during a predetermined period, and the variance may be operated manually by an operator or determined by the one or more algorithms. For instance, during a period of two hours, the status of the one or more video switches may be that each video switch is on for two minutes one after another. The video switch data obtained from the remote video switcher 108 may be transmitted (e.g., through the one or more cables 106 to one or more cue light devices (e.g., cue light devices 102/200) and then through the one or more connection interfaces 202 (e.g., RJ45 interfaces) to the microcontroller 204 within each of the one or more cue light devices. In some embodiments, the video switch data may be transmitted via a wireless connection (e.g., a wireless network).

Step 402 may include a step of determining position data from a multi-position switch or switch array of the cue light device. The multi-position switch or switch array may include one or more single switches, each of which can switch on binary or multiple positions. (e.g., on or off position). The multi-position switch may include at least 1, 2, 3 or more positions. In some embodiments, the multi-position switch may include at most 4, 3, 2, or fewer positions. In one example, the multi-position switch may be 5 positions. Details of the positions are described elsewhere herein. Determining the position data may include determining a status of multiple positions of the multi-position switch. The position data may include information regarding the configuration or status of the multi-position switch. For example, if determining a status of 3 positions of the multi-position switch, the configuration or status of the 3 positions of the multi-position switch may include an on-off status of each of the 3 positions. In this situation, the 3 positions may be associated with status data from a video switch of a remote video switcher (e.g., one of the video switches 112 of the remote video switcher 108) based on an exchange between a binary code and a decimal code. An on status of a position may correspond to binary code "1," and an off status of a position may correspond to binary code "0." For example, if the on-off status of the 3 positions is on-on-off, then the binary code may be 110, which is corresponding to a decimal code "6," representing the sixth video switch of the remote video switcher 108. In this case, a segment of data or signal from sixth video switch instead of the rest of the video switches may be processed by a microcontroller 204 of the cue light device 200. In another example, if the on-off status of the 3 positions is off-on-on, then the binary code may be 011, which is corresponding to a decimal code "3," representing the third video switch of the remote video switcher 108. In this case, a segment of data or signal from the third video switch instead of the rest of the video switches may be processed by a microcontroller 204 of the cue light device 200.

In another example, if determining a status of the positions of a multi-position switch having 5 positions, the configuration or status of the 5 positions of the multi-position switch may include an on-off status of the 5 positions. In this situation, for example, 3 positions of the 5 positions may be associated with one of the video switches 112 of the remote video switcher 108 based on an exchange between a binary code and a decimal code, and the remaining 2 positions of the 5 positions may control other aspects of the cue light device associated with the multi-position switch, such as a brightness and a mode (e.g., blinking or colored light) of the cue light device. For example, if the on-off status of the 3 positions of the 5 positions is on-on-off, then the binary code may be 110, which is corresponding to a decimal code "6," representing the status data from the sixth video switch of the remote video switcher 108. The remaining 2 positions of the 5 positions may control a dimmed light and an operation pattern that the light source is flashed once every second. In this case, a segment of data or signal from the sixth video switch instead of the rest of the video switches may be processed by a microcontroller of the cue light device, and if there is any signal from the sixth video switch, the light source of the cue light device may, e.g., be dimmed light that flashes once every second.

Step 403 may include a step of determining an instructed status of the cue light device based on the video switch data and the position data using one or more algorithms. In some embodiments, this step may be performed by, e.g., the microcontroller of the cue light device. The instructed status of the cue light device may include an on-off status, a brightness status, a mode status of the light source of the cue light device, and/or any other status indicated by the position data. The on-off status may include whether the light source of the cue light device should be on or off. The brightness status may represent an instructed level of brightness of the light source. The mode status may represent an instructed mode (e.g., flashing, color, etc.) of the light source. Determining an instructed status of the cue light device based on the video switch data and the position data using one or more algorithms may include matching/comparing the video switch data with the position data. For instance, the video switch data may represent that the sixth video switch is on and the rest of the video switches are off (e.g., sixth video input is active and the rest of the video inputs are not), and the position data of the cue light device may indicate that the microcontroller of the cue light device may process the segment of data or signal from the sixth video switch of a remote video switcher, instead of the rest of the video switches. In this situation, the instructed status of the cue light device may be "on" because there is a match between the video switch data and the position data. In another example, the video switch data may represent that the second video switch (e.g., input) is live and the rest of the video switches are off (e.g., inputs are not live), and position data may represent that the microcontroller of the cue light device may process the segment of data or signal from the sixth video switch instead of the rest of the video switches. In this situation, the instructed status of the cue light device may be "off" because there is not a match between the video switch data and the position data. In yet another example, the video switch data may represent that the sixth video switch is on and the rest of the video switches are off; position data may represent that the microcontroller of the cue light device may process the segment of data or signal from the sixth video switch instead of the rest of the video switches; and position data may also indicate that the light source may show dimmed light every 1 second. In this situation, the instructed status of the cue light device may be "on," with a dimmed light showing every 1 second.

Step 404 may include a step of controlling, via a microcontroller of the cue light device, the light source of the cue light device based on the instructed status of the cue light device. The controlling may include controlling at least one of an on-off operation, brightness, and/or a mode of the light source. For instance, if the instructed status of the cue light device is determined to be on in step 403, then the microcontroller may control the light source to be on. Details of the on-off operation, brightness, or a mode of the light source are described elsewhere herein. In some embodiments, the on-off operation may include a color change of the light source. For instance, the on operation may be shown in green color by the light source, and the off operation may be shown in red color by the light source. In this situation, the color change of the light source from green to red may represent a change from the on operation to the off operation of the light source. In another example, the on operation may be shown in red color (e.g., a warning sign) by the light source, and the off operation may be shown in green color (e.g., a safe sign) by the light source. In this situation, the color change of the light source from red to green may represent a change from the on operation to the off operation of the light source.

Figure 5:
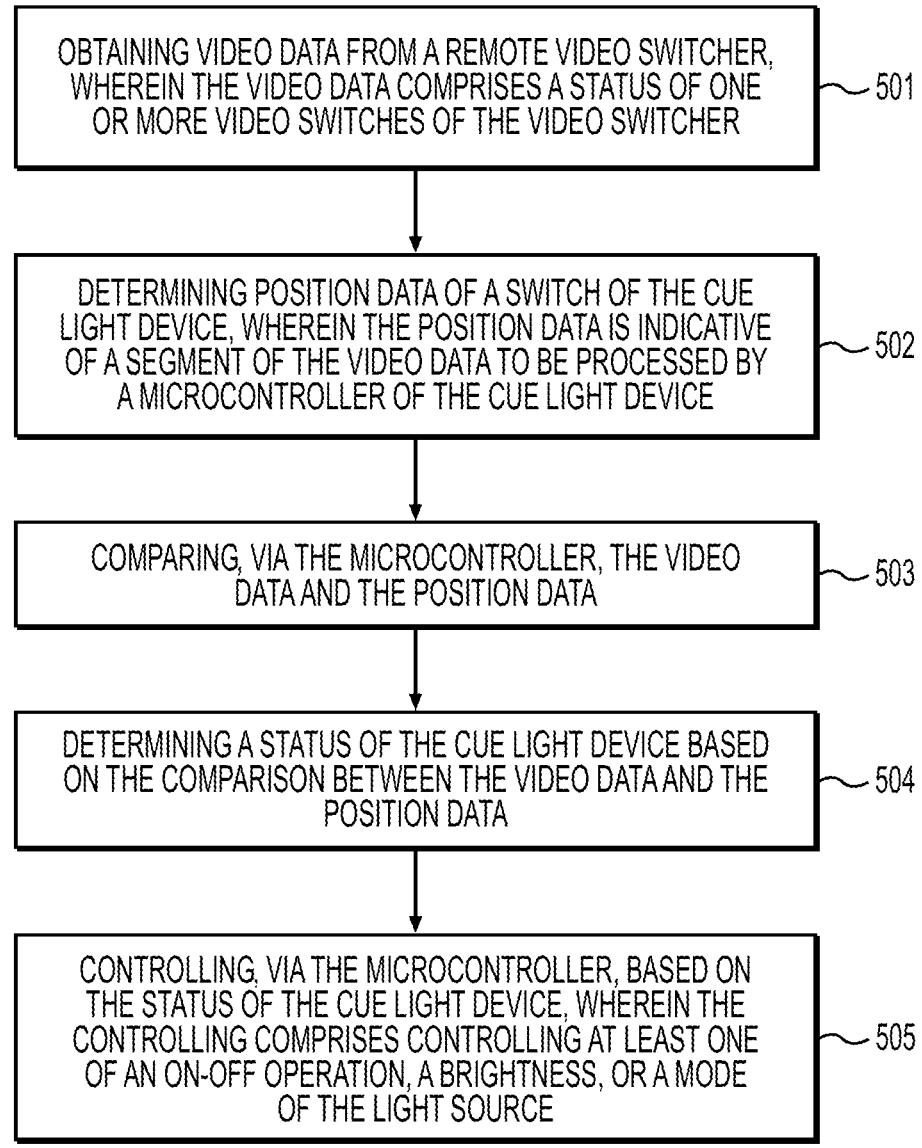
FIG. 5 depicts another exemplary flowchart illustrating a method for controlling a light source of a cue light device, according to one or more embodiments.

FIG. 5 is a flowchart illustrating another exemplary method for controlling a light source of a cue light device, according to one or more embodiments of the present disclosure. In some embodiments, the method may be performed by, e.g., the computer system described in FIG. 6, in conjunction with one or more microcontrollers of cue light devices.

Step 501 may be similar to step 401, which includes a step of obtaining video switch data from a remote video switcher (e.g., the remote video switcher 108). The video switch data may comprise a status of one or more video switches of the remote video switcher. The status of the one or more video switches (e.g., sources) of the remote video switcher may include an on-off status of the one or more video switches (e.g., sources). Details of the status of the one or more video switches are described elsewhere herein.

Step 502 may be similar to step 402, which includes a step of determining position data of a multi-position switch of the cue light device. The position data may be indicative of a segment of the video switch data to be processed by a microcontroller of the cue light device. For instance, if the position data includes the configuration or status of the 3 positions of the multi-position switch showing a binary code corresponding to the third video switch, then the position data may indicate that a segment of data or signal from third video switch instead of the rest of the video switches may be processed by a microcontroller of the cue light device.

Step 503 may include a step of comparing, via the microcontroller, the video switch data and the position data. Step 504 may include a step of determining an instructed status of the cue light device based on the comparison between the video switch data and the position data. For instance, the video switch data may represent that the sixth video switch is on and the rest of the video switches are off, and position data may represent that on-off status of the 3 positions of the multi-position switch corresponding to the sixth video switch. In this situation, the instructed status of the cue light device may be "on" because there is a match between the video switch data and the position data, wherein the position data shows that the microcontroller of cue light device may process the data from the sixth video switch and video switch data shows that the sixth video switch is on. In another example, the video switch data may represent that the second video switch is on and the rest of the video switches are off, and position data may represent that on-off status of the 3 positions of the multi-position switch corresponding to the third video switch. In this situation, the instructed status of the cue light device may be "off" because there is not a match between the video switch data and the position data, wherein the position data shows that the microcontroller of the cue light device may process the data of the second video switch but video switch data shows that the second video switch is off.

Step 505 may be similar to step 404, which includes a step of controlling the light source, via the microcontroller, based on the instructed status of the cue light device, wherein the controlling comprises controlling at least one of an on-off operation, a brightness, or a mode of the light source. Details of the on-off operation, a brightness, or a mode of the light source are described elsewhere herein. In some embodiments, the on-off operation may include a color change of the light source. For instance, the on operation may be shown in green color by the light source, and the off operation may be shown in red color by the light source. In this situation, the color change of the light source from green to red may represent a change from the on operation to the off operation of the light source. In another example, the on operation may be shown in red color (e.g., a warning sign) by the light source, and the off operation may be shown in green color (e.g., a safe sign) by the light source. In this situation, the color change of the light source from red to green may represent a change from the on operation to the off operation of the light source.

Prior to step 501, or at any stage of controlling a light source of a cue light device, the method may include a step of programming a remote video switcher with a sequence of video switch statuses. Such programming may be done by an operator of the cue light device or an algorithm (e.g., trained machine learning algorithm). For instance, a plurality of electronic devices (e.g., laptops) may be used for a conference presentation, and each of the plurality of electronic devices may be connected with a cue light device. A sequence of using the plurality of electronic devices (e.g., a sequence of turning on and presenting different slides with different electronic devices) may be decided. In this situation, a sequence of video switch statuses may be programmed based on the sequence of using the plurality of electronic devices.

The instructed status of the one or more video switches or any operations of the cue light device may be determined by the one or more algorithms. For example, the one or more algorithms may include a trained machine learning algorithm. The trained machine learning algorithm may include, e.g., a regression-based model that accepts the prior status of the one or more video switches, any information regarding one or more electronic devices (e.g., a prior sequence of using the plurality of electronic devices), or any information regarding controlling the light source of the cue light device as input data. The trained machine learning algorithm may be of any suitable form, and may include, for example, a neural network. A neural network may be software representing a neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through connections' weight. A neural network may include a convolutional neural network, a deep neural network, or a recurrent neural network.

The trained machine learning algorithm may determine the status of the one or more video switches or an operation of the cue light device as a function of the prior status of the one or more video switches, prior information regarding one or more electronic devices (e.g., a prior sequence of using the plurality of electronic devices), prior information regarding controlling the light source of the cue light device, or one or more variables indicated in the input data. The one or more variables may be derived from the prior status of the one or more video switches, prior information regarding one or more electronic devices (e.g., a prior sequence of using the plurality of electronic devices), or prior information regarding controlling the light source of the cue light device. This function may be learned by training the machine learning algorithm with training sets. The machine learning algorithm may be trained by supervised, unsupervised or semi-supervised learning using training sets comprising data of types similar to the type of data used as the model input.

The future status of the one or more video switches or future operation of the cue light device determined by the machine learning model may be used as an additional input variable.

In general, any process discussed in this disclosure that is understood to be computer-implementable, such as the processes illustrated in FIGS. 4-5, may be performed by one or more processors of a computer system. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system may include one or more computing devices. If the one or more processors of the computer system are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 6:
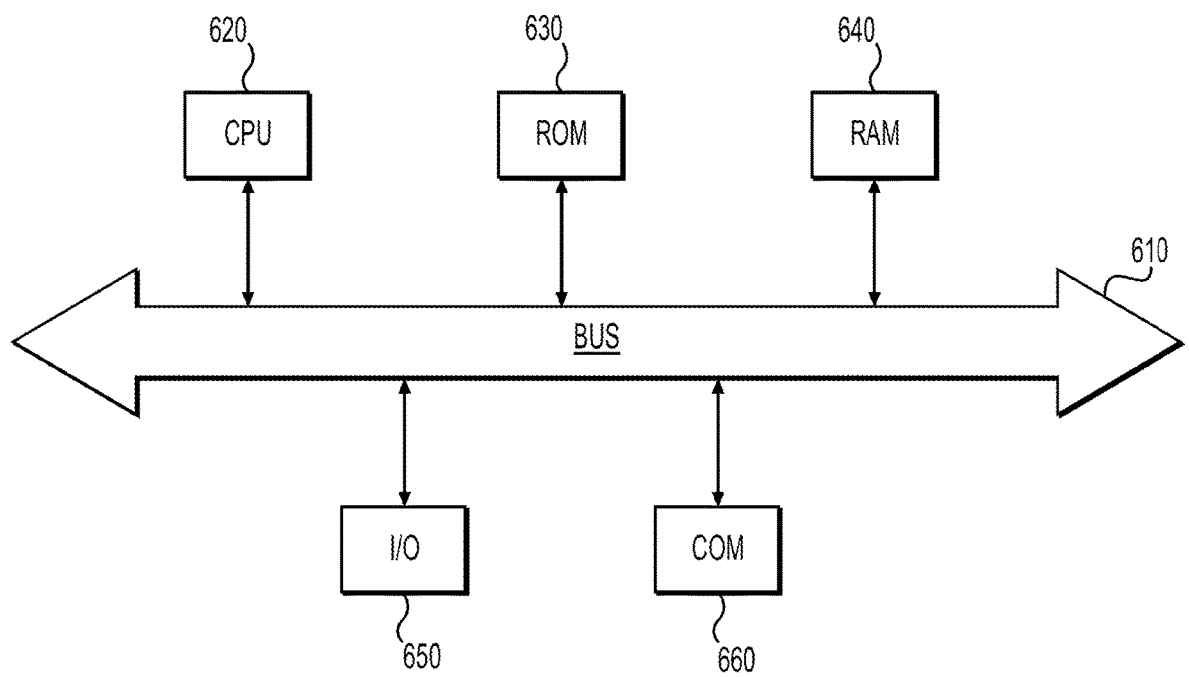
FIG. 6 depicts an example of a computing device, according to one or more embodiments.

FIG. 6 illustrates an example of a computing device 600 of a computer system. The computing device 600 may include processor(s) 610 (e.g., CPU, GPU, or other such processing unit(s)), a memory 620, and communication interface(s) 640 (e.g., a network interface) to communicate with other devices. Memory 620 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 620. The computing device 600 may, in some embodiments, further include input device(s) 650 (e.g., a keyboard, mouse, or touchscreen) and output device(s) 660 (e.g., a display, printer). The aforementioned elements of the computing device 600 may be connected to one another through a bus 630, which represents one or more busses. In some embodiments, the processor(s) 610 of the computing device 600 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A method for controlling a light source of a cue light device, the method comprising:
   programming a remote video switcher with a sequence of video switch statuses;
   retrieving the sequence of video switch statuses from the remote video switcher;
   determining a current status of the cue light device relative to the sequence of video switch statuses; and
   controlling the light source based on the current status of the cue light device relative to the sequence of video switch statuses.

2. The method of claim 1, further comprising, prior to determining the current status of the cue light device:
   receiving input data indicative of a prior status of the cue light device relative to the sequence of video switch statuses.

3. The method of claim 2, further comprising, prior to determining the current status of the cue light device:
   determining an operation of the cue light device as a function of prior status of the cue light device.

4. The method of claim 3, wherein determining the current status of the cue light device is at least partially based on the operation of the cue light device during the prior status of the cue light device.

5. The method of claim 2, further comprising, prior to determining the current status of the cue light device:
   training a machine learning model to determine statuses of the cue light device based on the prior status relative to the sequence of video switch statuses.

6. The method of claim 5, further comprising:
   determining a future status of the cue light device relative to the sequence of video switch statuses using the trained machine learning model.

7. The method of claim 5, wherein the remote video switcher is programmed with the sequence of video switch statuses by the trained machine learning model.

8. The method of claim 1, further comprising, prior to determining the current status of the cue light device:
   determining a current characteristic of the light source based on a configuration of the cue light device.

9. The method of claim 8, further comprising:
   determining the current status of the cue light device based on the current characteristic of the light source.

10. The method of claim 9, wherein controlling the light source based on the current status of the cue light device comprises changing the current characteristic of the light source.

11. The method of claim 8, wherein the configuration of the cue light device defines a position of a switch, and the current characteristic defines an operation mode of the light source.

12. The method of claim 11, wherein the operation mode of the light source includes a brightness, a color, a pattern, and a predetermined period of illumination.

13. A method for controlling a plurality of cue light devices, the method comprising:
   programming a remote video switcher with a plurality of video switch statuses;
   receiving the plurality of video switch statuses from the remote video switcher;
   determining a status for each of the plurality of cue light devices relative to the plurality of video switch statuses;
   determining a sequence for operating the plurality of cue light devices based on the status of the plurality of cue light devices relative to the plurality of video switch statuses; and
   controlling a light source of each of the plurality of cue light devices based on the sequence.

14. The method of claim 13, wherein controlling the light source of each of the plurality of cue light devices based on the sequence comprises:
   activating or deactivating the light source of each of the plurality of cue light devices.

15. The method of claim 13, wherein each of the plurality of cue light devices is connected to at least one electronic device, the method further comprising:
   presenting a display on the at least one electronic device of each of the plurality of cue light devices when controlling the light source based on the sequence.

16. The method of claim 13, further comprising, prior to determining the status for each of the plurality of cue light devices:
   training a machine learning model to determine statuses of the plurality of cue light devices based on a prior sequence of video switch statuses relative to the plurality of video switch statuses.

17. The method of claim 16, further comprising:
   determining the sequence for operating the plurality of cue light devices using the trained machine learning model.

18. The method of claim 13, further comprising, prior to determining the status for each of the plurality of cue light devices:
   determining a characteristic of the light source of each of the plurality of cue light devices based on a configuration of the plurality of cue light devices; and
   determining the status of the plurality of cue light devices based on the characteristic of the light source;
   wherein controlling the light source of each of the plurality of cue light devices based on the sequence comprises changing the characteristic of the light source.

19. A system, comprising:
   at least one video switcher;
   a plurality of electronic devices;
   a plurality of cue light devices connected to the plurality of electronic devices, wherein each of the plurality of cue light devices includes a light source; and
   at least one microcontroller electrically coupled to the light source of the plurality of cue light devices, the at least one microcontroller is configured to obtain data indicative of a sequence of a plurality of video switch statuses from the at least one video switcher, and selectively illuminate the light source based on the sequence of the plurality of video switch statuses.

20. The system of claim 19, wherein the at least one microcontroller is configured to train a machine learning model to determine a status of the plurality of cue light devices relative to the sequence of the plurality of video switch statuses based on a prior status of the plurality of cue light devices.

* * * * *